United States Patent
Shih et al.

(10) Patent No.: US 8,139,379 B2
(45) Date of Patent: Mar. 20, 2012

(54) REVERSE ENERGY RECOVERY CIRCUIT

(75) Inventors: Yung-Hsiang Shih, Taoyuan Hsien (TW); Chung-Pin Kan, Taoyuan Hsien (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 143 days.

(21) Appl. No.: 12/707,411

(22) Filed: Feb. 17, 2010

(65) Prior Publication Data

US 2011/0199791 A1 Aug. 18, 2011

(51) Int. Cl.
*H02M 3/335* (2006.01)
(52) U.S. Cl. .................. 363/21.08; 363/21.12
(58) Field of Classification Search .......... 363/16, 363/21.08–21.18, 131
See application file for complete search history.

(56) References Cited

U.S. PATENT DOCUMENTS

| | | | | |
|---|---|---|---|---|
| 5,805,434 A | * | 9/1998 | Vinciarelli et al. | 363/16 |
| 6,195,270 B1 | * | 2/2001 | Wittenbreder | 363/17 |
| 2004/0233689 A1 | * | 11/2004 | Yan et al. | 363/132 |
| 2007/0013349 A1 | * | 1/2007 | Bassett | 323/222 |

FOREIGN PATENT DOCUMENTS

| | | | |
|---|---|---|---|
| SU | 1015475 A | * | 4/1983 |
| TW | 583830 | | 11/2002 |

OTHER PUBLICATIONS

Derwent, Abstracted-Pub-No. SU1015475A, Sep. 1984, Derwent, A, 1.*

* cited by examiner

*Primary Examiner* — Jue Zhang
(74) *Attorney, Agent, or Firm* — Winston Hsu; Scott Margo

(57) ABSTRACT

A reverse energy recovery circuit is located on a power conversion circuit equipped with a transformer which has a primary winding side connected to a power switch driven by a control unit. The primary winding side has a first end and a second end bridged by the reverse energy recovery circuit which comprises a first capacitor, a second capacitor, an ancillary winding and a diode. The first and second capacitors are coupled in series. The second capacitor has one end connected to the first end of the primary winding side. The ancillary winding has a first end connected to the first end of the primary winding side. The diode has a cathode connected to a second end of the ancillary winding and an anode bridged the first and second capacitors so that the diode and ancillary winding form a one way path between the first and second capacitors.

11 Claims, 4 Drawing Sheets

REVERSE ENERGY RECOVERY CIRCUIT

FIELD OF THE INVENTION

The present invention relates to a reverse energy recovery circuit and particularly to a circuit adopted for use on a power conversion circuit equipped with a transformer to recover reverse surge energy generated by instantaneous switch at two ends of the transformer.

BACKGROUND OF THE INVENTION

Many electric devices at present are driven by a specific potential. Hence power conversion circuits are widely used to meet this purpose. Improvements are constantly made to achieve more stable output voltage and higher conversion efficiency. Power conversion is affected by many factors, such as loss of elements and loss caused by leakage or mutual offset when energy is transformed to magnetic force during power conversion. As a great amount of current passes through the transformer in the conversion circuit, leakage inductance stored in the transformer constantly stores energy and generates a reverse surge (shown by the front edge of square waveforms in FIG. 1) while the power switch in the conversion circuit is switched repeatedly. The reverse surge constantly applies to the elements connected to the transformer, as a result the performance of the peripheral elements (such as power elements, capacitors and the like) deteriorates after a period of time, even the life span of the elements could suffer. Moreover, if the reverse surge energy is not properly guided, power conversion efficiency drops. Even if the reverse surge energy has been properly guided, it still exists in the loss, hence total conversion efficiency of the circuit does not improve significantly.

In order to improve the conversion efficiency to meet increasingly enhanced energy regulations of various countries, many techniques have been provided in prior art to address the aforesaid surge problem. For instance, R.O.C. patent No. 583830 entitled "Converter equipped with an active LC snubber circuit" discloses an LC snubber circuit to suppress the surge and recover the surge energy for reusing. The LC snubber circuit includes a diode, a capacitor, a second transformer and a second switch. Its circuit contains a main transformer coupled with a clamp capacitor (Cs) to store energy. Through the diode the reverse surge energy is transmitted from the clamp capacitor (Cs) to the second transformer. The secondary side of the second transformer and the second switch and aforesaid capacitor recover the reverse surge energy to supply to a second load. It can suppress the surge and recover the energy, but still has a drawback, namely requires additional second transformer and second switch. Not only its cost is higher, more space has to be allocated and occupied in the limited interior space of the power circuit casing. Moreover, although the reverse surge energy is recovered to supply to the load, it has to go through transformation via the second transformer, and loss occurs by one more time of energy transformation to the secondary side. The additional cost outweighs the generated benefit.

SUMMARY OF THE INVENTION

In view of the deficiency of the aforesaid conventional technique, the primary object of the present invention is to provide a recovery circuit to suppress the reverse energy of the transformer and recover the reverse energy for reusing to prevent the reverse energy from damaging the electronic elements or shortening their life span.

The present invention provides a reverse energy recovery circuit located in a power conversion circuit equipped with a transformer. The transformer has a primary winding side connected to a power switch which is driven by a control unit to determine the cycle of input power passing through the primary winding side. The primary winding side has a first end and a second end bridged by the reverse energy recovery circuit. The reverse energy recovery circuit comprises a first capacitor, a second capacitor, an ancillary winding and a diode. The first and second capacitors are coupled in series. The second capacitor has one end connected to the first end of the primary winding side. The ancillary winding has a first end connected to the first end of the primary winding side. The diode has a cathode connected to a second end of the ancillary winding and an anode bridged the first and second capacitors so that the diode and ancillary winding form a one way path between the first capacitor and the second capacitor. ON/OFF of the diode determines the reverse energy charging the first and second capacitors from the first end of the primary winding side, or the first capacitor discharging through the diode.

The aforesaid charge and discharge paths can store and reuse the reverse energy stored in the transformer. The circuit structure is simpler and can be made at a lower cost without occupying too much space.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
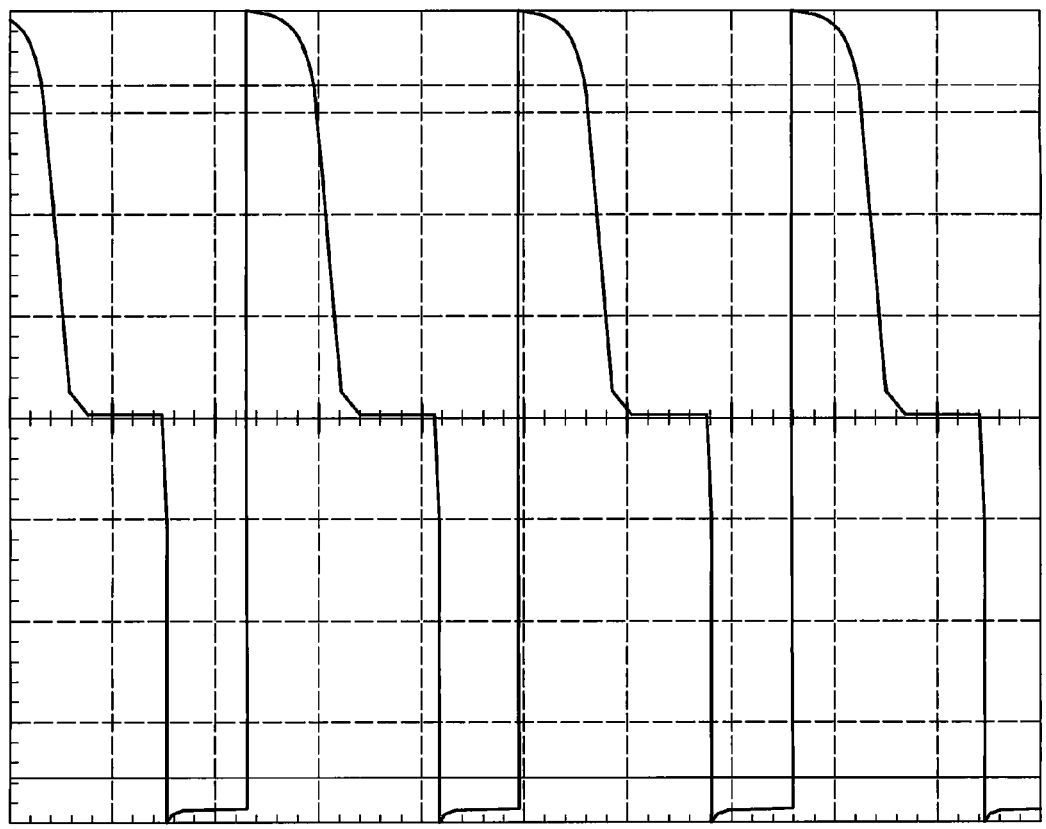
FIG. 1 is a conventional reverse energy waveform chart.

The present invention aims to provide a reverse energy recovery circuit in a power conversion circuit. Please refer to FIGS. 2 and 3 for an embodiment of the present invention. The power conversion circuit includes a transformer 1 which contains a primary winding side 11 and a secondary winding side 12. The primary winding side 11 is connected to a power switch 2 controlled by a control unit 3. The control unit 3 determines ON/OFF of the power switch 2 to further determine the cycle of input power passing through the primary winding side 11. The secondary winding side 12 generates an induction power through magnetic induction. The primary winding side 11 has a first end and a second end bridged by the reverse energy recovery circuit. The reverse energy recovery circuit comprises a first capacitor 41, a second capacitor 42, an ancillary winding 43 and a diode 44. The first and second capacitors 41 and 42 are coupled in series. The second capacitor 42 has one end connected to the first end of the primary winding side 11. The ancillary winding 43 has a first end connected to the first end of the primary winding side 11 and a second end connected to a cathode of the diode 44. The diode 44 has an anode bridged the first and second capacitors 41 and 42 so that a one way path is formed between the first and second capacitors 41 and 42 for the first capacitor 41 discharging. Moreover, the first end of the ancillary winding 43 and the first end of the primary winding side 11 that are connected to form opposite magnetic polarities. Hence when a current passes through the primary winding side 11, the ancillary winding 43 can induct an opposite polarity.

Figure 2:
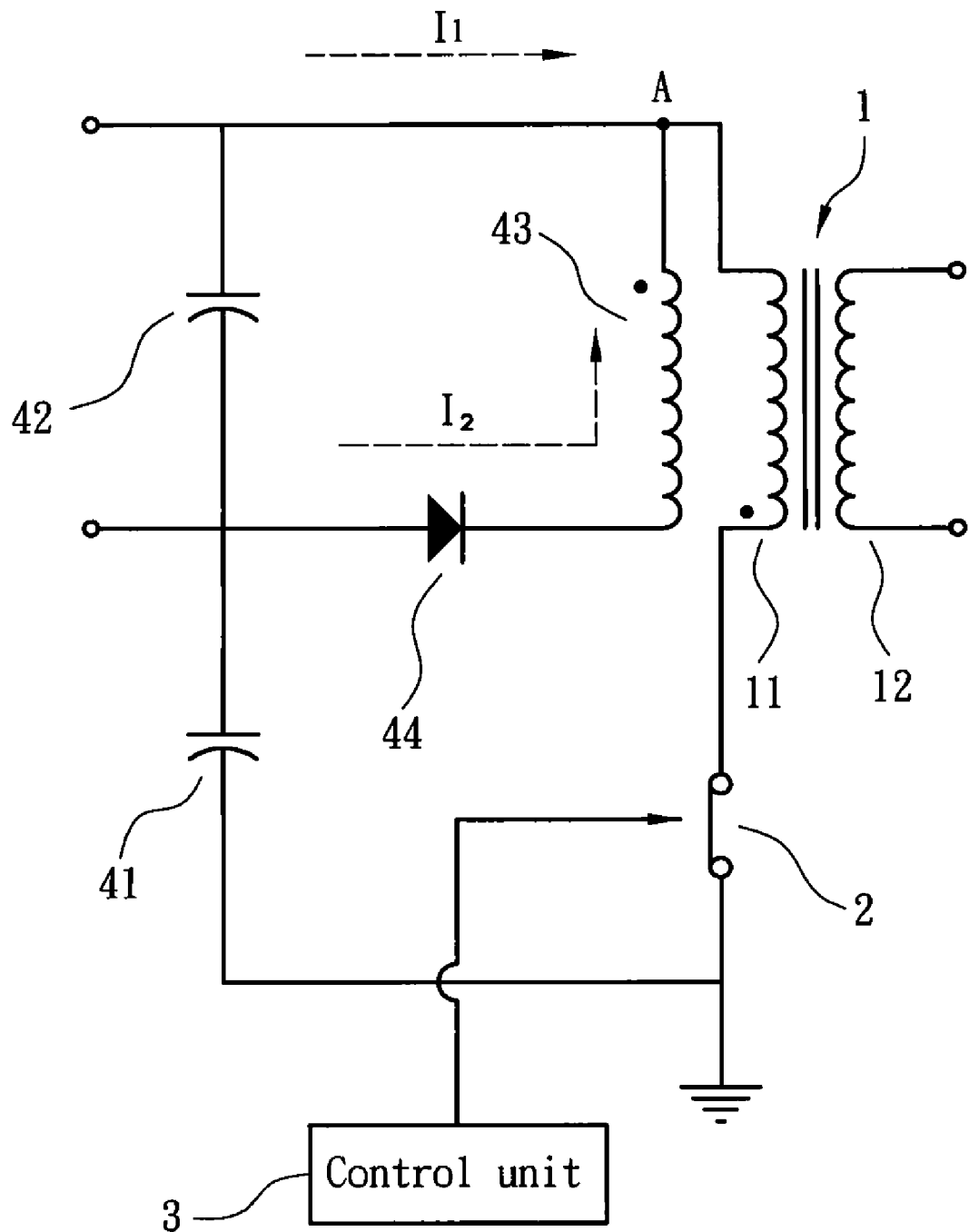
FIG. 2 is a circuit diagram of an embodiment of the present invention.
Figure 3:
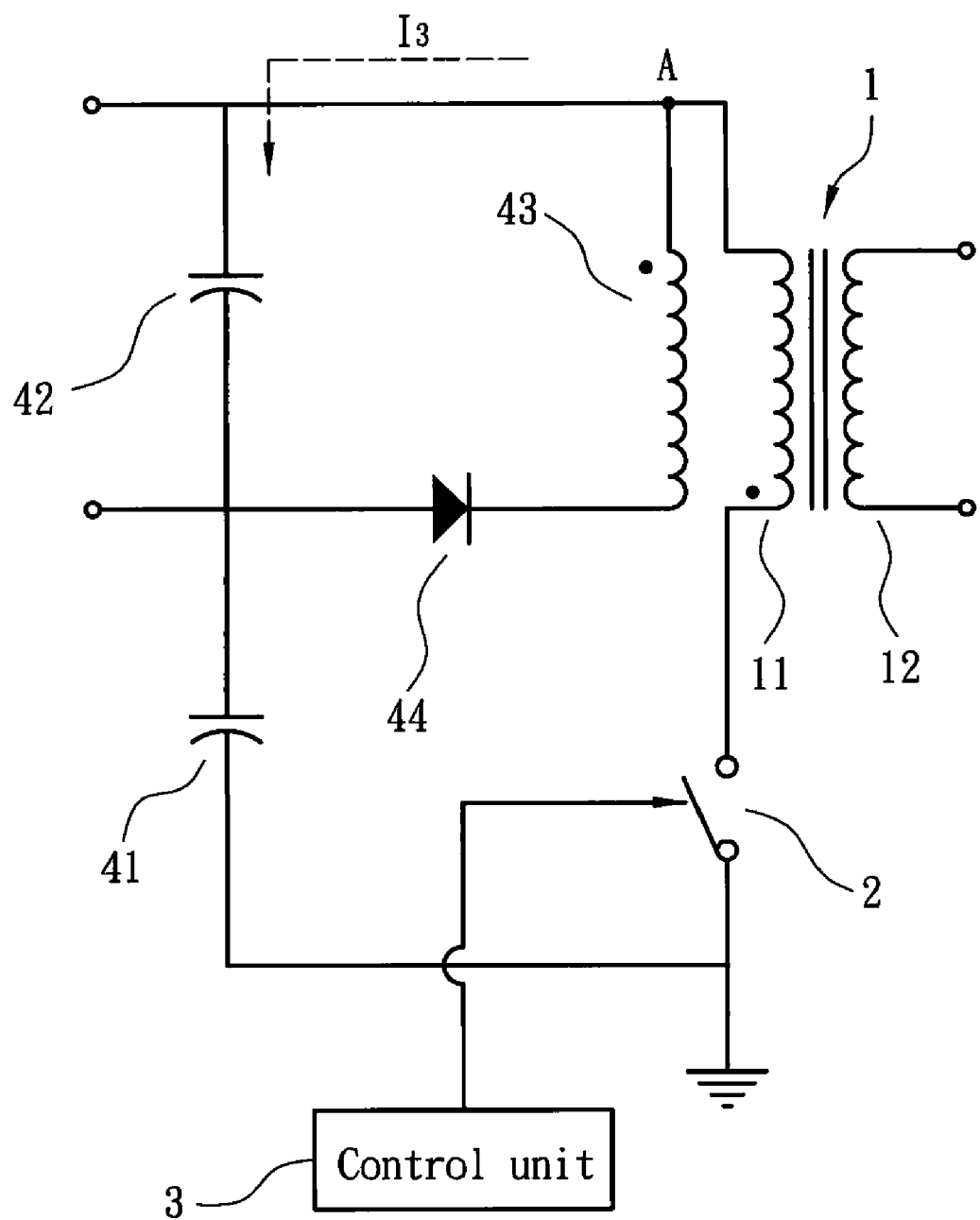
FIG. 3 is another circuit diagram of an embodiment of the present invention.
Figure 4:
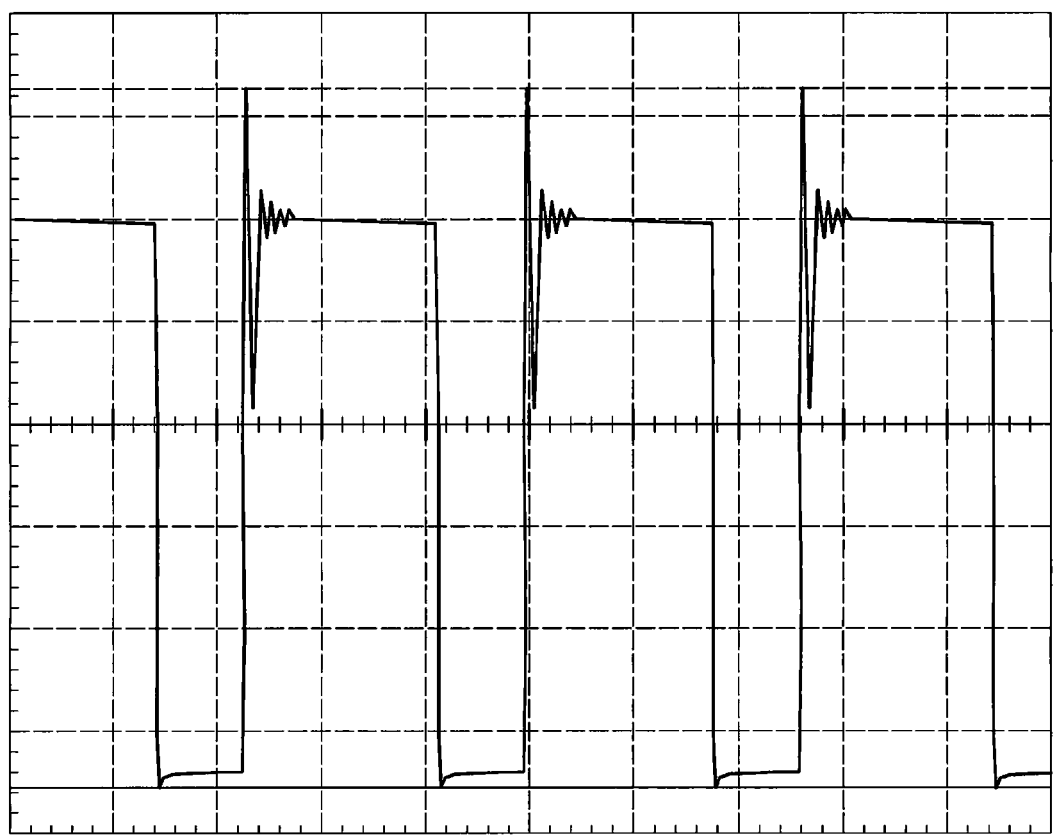
FIG. 4 is a waveform chart at node A according to the circuit of the present invention.

Referring to FIG. 2, when the power switch 2 is ON, the input power passes through the primary winding side 11 (marked by $I_1$ in the drawings), and the secondary winding side 12 generates the induction power; meanwhile, the primary winding side 11 stores an energy due to leakage inductance. Referring to FIG. 3, when the power switch 2 is OFF, the abrupt cutoff of the power path generates an instantaneous voltage alteration so that the energy stored in the primary winding side 11 flows reversely to become a reverse energy. As the ancillary winding 43 at the same time inducts a high voltage at the first end due to the induction of the primary winding side 11, the diode 44 is cut-off, and the reverse energy charges the first and second capacitors 41 and 42. When the power switch 2 is set ON at a next cycle, the primary winding side 11 is inducted to lower the voltage of the first end of the ancillary winding 43 so that the diode 44 is set ON and the first capacitor 41 discharges through the diode 44 (marked by $I_2$ in FIG. 2). Therefore, the reverse energy stored in the first and second capacitors 41 and 42 flows back again to the primary winding side 11.

As a conclusion, the reverse energy recovery circuit determines the path of recovery and release of the reverse energy through the ancillary winding 43 and the diode 44 so that the reverse energy can be flowed back again to the primary winding side 11, and transmitted to the secondary winding side 12 to become output of the transformer 1. Through the reverse energy recovery circuit energy can absorb the recovery energy, the voltage waveform at Node A of the circuit can more approach to a square waveform, and the instantaneous voltage surge during switching of the power switch 2 can be suppressed to prevent circuit elements from being damaged by the surge. Moreover, as the first end of the ancillary winding 43 connected to the first end of the primary winding side 11 forms in opposite polarities, a basic structure of a flyback circuit is formed to make duty cycle of the power switch 2 is greater than 50%. In addition, since the first and second capacitors 41 and 42 store the reverse energy, when the input power is cut off, the first and second capacitors 41 and 42 can release the reverse energy to extend hold time.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A reverse energy recovery circuit located in a power conversion circuit equipped with a transformer which includes a primary winding side connected to a power switch driven by a control unit to determine the cycle of input power passing through the primary winding side, the primary winding side including a first end and a second end bridged by a reverse energy recovery circuit, the reverse energy recovery circuit comprising:
   a first capacitor and a second capacitor coupled with each other in series, the second capacitor including one end connected to the first end of the primary winding side;
   an ancillary winding which includes a first end connected to the first end of the primary winding side; and
   a diode which includes an anode bridged the first capacitor and the second capacitor and a cathode connected to a second end of the ancillary winding to determine reverse energy charging the first capacitor and the second capacitor through the first end of the primary winding side and the first capacitor discharging through the diode;
   wherein the power conversion circuit comprises a set of input terminals, which comprise a first terminal and a second terminal; the first terminal is electrically connected to the first end of the primary winding side, and the second terminal is electrically connected to another end of the second capacitor and is electrically connected to the cathode of the diode; and the second terminal is not a ground terminal of the power conversion circuit.

2. The reverse energy recovery circuit of claim 1, wherein the first end of the ancillary winding and the first end of the primary winding side are formed in opposite magnetic polarities.

3. The reverse energy recovery circuit of claim 1, wherein the transformer further includes a secondary winding side.

4. The reverse energy recovery circuit of claim 3, wherein the reverse energy recovery circuit determines a path of recovery and release of the reverse energy through the diode and the ancillary winding, allowing the reverse energy to be transmitted to the secondary winding side to become output of the transformer.

5. The reverse energy recovery circuit of claim 1, wherein the reverse energy recovery circuit determines a path of recovery and release of the reverse energy through the diode and the ancillary winding, allowing the reverse energy to be released from the first capacitor.

6. The reverse energy recovery circuit of claim 1, wherein in a situation where the primary winding side is inducted to lower a voltage of the first end of the ancillary winding, the first capacitor discharges through the diode.

7. A reverse energy recovery circuit located in a power conversion circuit equipped with a transformer which includes a primary winding side connected to a power switch driven by a control unit to determine the cycle of input power passing through the primary winding side, the primary winding side including a first end and a second end bridged by a reverse energy recovery circuit, the reverse energy recovery circuit comprising:
   a first capacitor and a second capacitor coupled with each other in series, the second capacitor including one end connected to the first end of the primary winding side;
   an ancillary winding which includes a first end connected to the first end of the primary winding side; and
   a diode which includes an anode bridged the first capacitor and the second capacitor and a cathode connected to a second end of the ancillary winding to determine reverse energy charging the first capacitor and the second capacitor through the first end of the primary winding side and the first capacitor discharging through the diode;
   wherein the transformer further includes a secondary winding side; and the reverse energy recovery circuit determines a path of recovery and release of the reverse energy through the diode and the ancillary winding, allowing the reverse energy to be transmitted to the secondary winding side to become output of the transformer.

8. The reverse energy recovery circuit of claim 7, wherein the first end of the ancillary winding and the first end of the primary winding side are formed in opposite magnetic polarities.

9. The reverse energy recovery circuit of claim 7, wherein the reverse energy recovery circuit determines the path of recovery and release of the reverse energy through the diode and the ancillary winding, allowing the reverse energy to be released from the first capacitor.

10. The reverse energy recovery circuit of claim 7, wherein in a situation where the primary winding side is inducted to lower a voltage of the first end of the ancillary winding, the first capacitor discharges through the diode.

11. The reverse energy recovery circuit of claim 7, wherein the power conversion circuit comprises a set of input terminals, which comprise a first terminal and a second terminal; the first terminal is electrically connected to the first end of the primary winding side, and the second terminal is electrically connected to another end of the second capacitor and is electrically connected to the cathode of the diode; and the second terminal is not a ground terminal of the power conversion circuit.

* * * * *